June 24, 1924.
R. A. DAILEY
FLOW NIPPLE
Filed Nov. 29, 1922
1,498,682
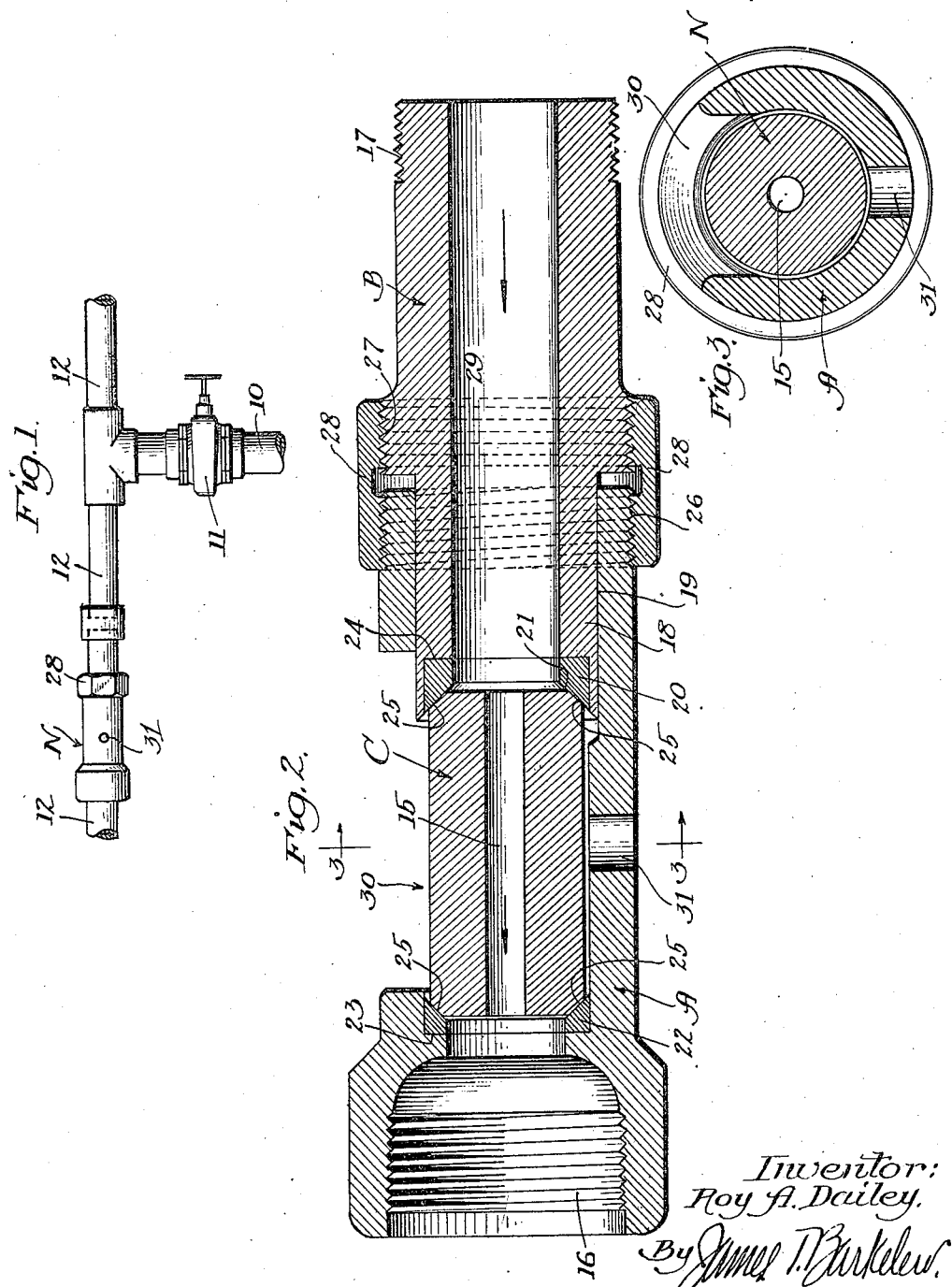

Patented June 24, 1924.

1,498,682

UNITED STATES PATENT OFFICE.

ROY A. DAILEY, OF TAFT, CALIFORNIA, ASSIGNOR OF ONE-FOURTH TO T. I. SHARP, OF LONG BEACH, CALIFORNIA.

FLOW NIPPLE.

Application filed November 29, 1922. Serial No. 603,945.

*To all whom it may concern:*

Be it known that I, ROY A. DAILEY, a citizen of the United States, residing in Taft, county of Kern, State of California, have invented new and useful Improvements in Flow Nipples, of which the following is a specification.

This invention has to do with devices for controlling or restricting the flow of fluid under pressure; and although the invention is capable of being used in various situations, it is here illustrated and described as a flow nipple to control and restrict the flow of fluid from a well.

Where an oil or gas well is flowing under high pressure, if it is attempted to control the flow with a valve the high velocity soon wears the valve so that it cannot be closed when desired. It has therefore been the practice to insert in the discharge line from such a well a flow nipple, or some device to restrict the flow independently of the valve so that the valve may then be used only for completely shutting off the flow. My invention provides an improved form of flow nipple, one in which the flow restricting part is so constructed as to effectively stand the high pressure and velocity and at the same time is made easily changeable if it is desired to change the size of the flow controlling orifice.

The various objects and corresponding advantages of my invention will be best understood from the following detailed description of a preferred form of the device as used for controlling flow from wells, reference for this purpose being made to the accompanying drawings in which—

Fig. 1 is an elevation showing how my flow nipple is installed;

Fig. 2 is an enlarged longitudinal section of the flow nipple itself; and,

Fig. 3 is a cross section on line 3—3 of Fig. 2.

In the drawings I illustrate at 10 the upper end of a well pipe or casing, and at 11 the usual gate valve with which the flow may be completely shut off. When the flow nipple is in use this valve is either in a completely closed position or is wide open; and being thus wide open when the fluid is flowing, the velocity through the valve is comparatively low. At the upper end of the well pipe there may be one or more branch discharge pipes 12 and the flow nipple illustrated generally at N in Fig. 1 may be put upon each of the discharge pipes if desired, to control and restrict the discharge flow through each of the pipes. The amount of restriction desired may depend upon several considerations—mainly upon the well pressure and the amount of fluid it is desired to discharge.

The body of the flow nipple comprises two main pieces A and B and a bushing C in which there is the orifice 15 that restricts the flow. For the purposes of varying this restriction I provide bushings C having orifices of various sizes; and my construction makes it easy to substitute one for another.

The body part A is provided at one end with a screw threaded connection 16 to the pipe line and the body part B is provided at the opposite end with a screw threaded connection 17 to the pipe line. Part B has what I may term a follower 18 that fits into the bore 19 of part A; and at its forward end this follower 18 carries an annular seat 20, preferably of some such material as brass, and having a conical seat face 21. There is a similar brass seat 22 carried in part A and shouldered up against shoulder 23 of part A. Brass seat 20 shoulders up against shoulder 24 in follower 18 and thus, as will be readily seen, the bushing C can be longitudinally held between the two sets by bringing parts A and B together. The bushing has at its ends the conical seating surface 25 to seat on the conical surface 21 of the seats, and to make fluid tight joints therewith.

As a preferred means of bringing parts A and B together I provide the end of part A with a screw thread 26 and provide part B with a screw thread 27, these two threads being, respectively, left and right. A similarly threaded nut 28 will, by its rotation in one direction withdraw part B from part A, and by rotation in the opposite direction draw the two parts together and tightly hold bushing C between the two seats 20 and 22. With the bushing in this position it is effective to control and restrict the flow of fluids which pass through the bore 29 of part B, and thus through orifices 15 of the bushing.

Part A is provided with an opening 30 through its wall of sufficient width and length to pass the bushing C; and in the opposite part of its wall a small opening 31 is provided to insert a pin or any suitable tool to push bushing C out through opening 30. The nipple may thus be easily removed as part B is backed away from the part A. When the bushing is held tightly in position, there is no liability whatever of its being displaced. Furthermore, in its normal position, held between parts A and B, the bushing does not quite register with opening 30, as to longitudinal position, as seen in Fig. 2. The left hand end of the bushing here projects to the left beyond the left hand end of opening 30; and it is necessary to withdraw part B to the right far enough not only to make part B clear the bushing but also to allow the bushing to be moved to the right far enough to make its left hand end come into the clear in opening 30.

The body parts of the device may be made of any suitable material to take the pressures and strains imposed. The bushing is preferably made of any suitable material, preferably of hard steel to resist wear and its length is also such as to make orifice 15 long enough that the wear on the orifice is reduced to a minimum.

Having described a preferred form of my invention, I claim:—

1. A flow controlling device embodying two parts with longitudinal fluid passages, a fluid flow controlling bushing held longitudinally between the parts and in fluid tight engagement therewith, and means to force the parts toward each other to hold the bushing in position and tightly seated at its ends on the said parts, one of the parts having an opening in its side wall through which the bushing may be inserted and withdrawn by lateral movement.

2. A flow controlling device embodying two parts with longitudinal fluid passages, a fluid flow controlling bushing held longitudinally between the parts and in fluid tight engagement therewith, means to force the parts toward each other to hold the bushing in position, one of the parts having an opening in its side wall through which the bushing may be inserted and withdrawn by lateral movement; and the bushing in its normal position being held between said parts longitudinally somewhat out of register with the opening.

3. A flow controlling device embodying a part with a bore, another part having a follower adapted to enter the bore, the first mentioned part and the forward end of the follower being provided with opposed seating surfaces, a bushing adapted to be held between the opposed seating surfaces, and means to draw the two parts forcibly together to hold the bushing between them; the first mentioned part having an opening through its wall through which the bushing may be inserted and withdrawn, and having an opposite opening through its wall for the insertion of a pin to push the bushing out through the first mentioned opening.

4. A fluid flow controlling device embodying a part with a bore, an annular conically faced seat mounted in said part at one end of the bore, another part having a follower adapted to enter the opposite end of the bore, an annular conically faced seat in the forward end of the follower, a bushing adapted to lie in the bore and be held longitudinally between the two seats, said first mentioned part having an opening through its wall for insertion and removal of the bushing and having an opposite opening for inserting a pin to push the bushing out through the first mentioned opening; and a right and left handed nut threaded onto the two parts for forcibly drawing them together and for withdrawing the follower from the first mentioned part.

In witness that I claim the foregoing I have hereunto subscribed my name this 16th day of November, 1922.

ROY A. DAILEY.

Witnesses:
J. F. YOUNG,
F. JOLIETFRIED.